Oct. 23, 1928.
G. W. WYCHE
1,689,065
SUBSOIL PLOW
Filed April 10, 1926
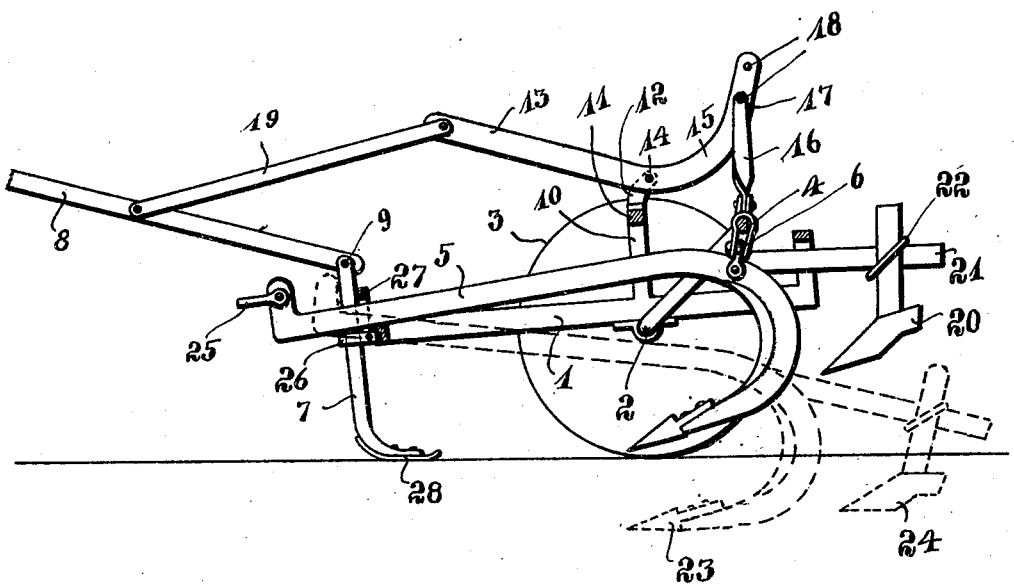
INVENTOR:
GEORGE W. WYCHE,
By: Otto H. Ranger,
his Atty.

Patented Oct. 23, 1928.

1,689,065

UNITED STATES PATENT OFFICE.

GEORGE W. WYCHE, OF ARCADIA, CALIFORNIA.

SUBSOIL PLOW.

Application filed April 10, 1926. Serial No. 101,104.

This invention relates to devices used to loosen soil beyond the reach of common plows.

One of the objects of this invention is to provide a truck on wheels, to be attached to a tractor, having a crank-like bend in its axle by which the subsoiler may be raised or lowered to a desired depth.

Another object is to provide a lever arrangement by which the subsoiler can be controlled while suspended on the crank of the main axle.

Another object is to provide adjustments in a lever control by which the working depth of the subsoiler can be controlled.

Another object is to provide attachments by which a common plow can be operated in conjunction with the subsoiler.

Another object is to provide adjustments by which the working depth of the attached plow can be controlled in a certain relation to the subsoiler.

Other objects will appear from the following description and appended claims as well as from the accompanying drawing, in which—

The figure illustrates a longitudinal midsectional view of a truck on wheels with a subsoiler and one additional plow of a simple form, embodying this invention.

As illustrated, the main frame 1 is mounted on the axle 2, on the ends of which the wheels 3 are turnably mounted. The axle is provided with a crank-like portion 4, from which the subsoiler 5 is suspended, as indicated at 6.

With this arrangement, the crank 4 may be moved to any angle without changing the relation of the wheels to the truck or main frame 1.

The front end of the main frame can be adjusted as to its position above the ground by the supporting leg 7 and shoe 28. The operating handle 8 is pivotally connected to the upper end of the leg, as indicated at 9. The uprights 10 project upwardly from opposite sides of the main frame 1, bridged by a cross member 11. A bracket 12 is mounted on the cross member 11 for pivotally supporting the control lever 13, as indicated at 14. The control lever 13 is provided with an extension end 15 projecting beyond the pivot 14. A connecting rod 16 serves to hold the subsoiler suspended from the lever extension-end 15, being pivotally attached to the lever at 17, and being linked to the subsoiler at 6.

The extent to which the subsoiler may be moved up and down, can be changed and adjusted through the adjustment of the rod 16 to different holes, indicated at 18.

The operating handle 8 and the control lever 13 are interconnected by the link or rod 19, the handle being on the front end of the truck, at a point to be reached from the tractor to which the truck may have been attached. On the other hand, the control lever 13 may also be extended to a suitable length to facilitate a handling and control of the plows directly, by this control lever instead of through an extra handle bar.

Additional plows 20 are adjustably applied to an extension-end 21 on the subsoiler 5, so that these additional plows, which may be of any desired shape or variety, may be caused to follow, tilt, furrow, or otherwise cultivate the soil loosened by the subsoiler. While the subsoiler may be set for a certain depth by the adjustments of the link at 17, to reach into the soil as indicated in dotted lines at 23, the following plow is held in certain relation to the subsoiler by the adjustments at 22, to automatically bring the following plow to a corresponding or desired depth and to maintain the plow in this certain relation to the subsoiler as indicated in dotted lines at 24. A shackle 25 is provided on the front end of the subsoiler, by which the whole device may be attached to a tractor. The block 26 serves to allow an adjusting of the leg 7 for setting the front end of the main frame to a certain desired height above the ground. The guide 27 serves to hold the main frame in certain relation to the subsoiler.

Having thus described my invention, I claim:

1. In a cultivator, an axle having straight wheel-supporting portions at its opposite ends and having a crank portion intermediate the straight ends, a frame pivotally supported on said straight ends having forwardly and rearwardly extending portions and having a central portion arched upwardly over said crank portion, a lever pivotally supported on said arched portion having one portion extending rearwardly and another portion extending forwardly, a link connecting the rearwardly extending portion of the lever with the crank portion of the axle, a subsoiler shiftably disposed in relation to the forward projecting portion of the said frame and suspended from said crank portion, a handle member, and operating means mounted on and pivotally connected to the front end of the said frame in operative connection with the forwardly projecting portion of said lever.

2. In a cultivator, an axle having straight wheel-supporting portions at its opposite ends and having a crank portion intermediate the straight ends, a frame pivotally supported on said straight ends having forwardly and rearwardly extending portions and having a central portion arched upwardly over said crank portion, a lever pivotally supported on said arched portion having one portion extending rearwardly and another portion extending forwardly, a link connecting the rearwardly extending portion of the lever with the crank portion of the axle, a subsoiler shiftably disposed in relation to the forward projecting portion of the said frame and suspended from the said crank portion, a handle member, operating means mounted on and pivotally connected to the front end of the said frame in operative connection with the forwardly projecting portion of said lever, and means on the subsoiler for adjustably supporting additional plows to automatically cooperate with the subsoiler at a certain depth and in certain relation to the operations of the subsoiler.

3. In a cultivator, an axle having straight wheel-supporting portions at its opposite ends and having a crank portion intermediate the straight ends, a frame pivotally supported on said straight ends having forwardly and rearwardly extending portions and having a central portion arched upwardly over said crank portion, a lever pivotally supported on said arched portion having one portion extending rearwardly and another portion extending forwardly, a link connecting the rearwardly extending portion of the lever with the crank portion of the axle, a subsoiler shiftably disposed in relation to the forward projecting portion of the said frame and suspended from the said crank portion, a handle member, operating means mounted on and pivotally connected to the front end of the said frame in operative connection with the forwardly projecting portion of said lever, and adjusting means between said lever and said subsoiler for changing the extent of the movements of the subsoiler by the operating means.

In testimony that I claim the foregoing as my invention I have signed my name.

GEORGE W. WYCHE.